United States Patent [19]

Sahashi et al.

[11] Patent Number: 4,627,298

[45] Date of Patent: Dec. 9, 1986

[54] TORQUE SENSOR OF THE NONCONTACT TYPE

[75] Inventors: Masashi Sahashi, Fujisawa; Koichiro Inomata; Tadahiko Kobayashi, both of Yokohama, all of Japan

[73] Assignee: Kabushiki Kaisha Toshiba, Kawasaki, Japan

[21] Appl. No.: 643,703

[22] Filed: Aug. 24, 1984

[30] Foreign Application Priority Data

Aug. 30, 1983 [JP] Japan ............................ 58-158717
Sep. 17, 1983 [JP] Japan ............................ 58-164857
Dec. 8, 1983 [JP] Japan ............................ 58-230680

[51] Int. Cl.$^4$ .............................................. G01L 3/10
[52] U.S. Cl. ................................. 73/862.36; 324/209
[58] Field of Search ................. 73/862.36, 862.69; 336/20, 30, 135; 324/209

[56] References Cited

U.S. PATENT DOCUMENTS 4,364,278 12/1982 Horter et al. ................. 73/862.36
4,506,554 3/1985 Blomkvist et al. ............ 73/862.36

FOREIGN PATENT DOCUMENTS 57-211030 12/1982 Japan.
0274420 6/1970 U.S.S.R. ..................... 73/862.36

*Primary Examiner*—Donald O. Woodiel
*Attorney, Agent, or Firm*—Oblon, Fisher, Spivak, McClelland & Maier

[57] ABSTRACT

In a torque sensor of a noncontact type for sensing a rotary torque applied to a shaft, a magnetic ribbon of a film shape formed of a magnetic material and applied in advance with an induced magnetic anisotropy in the direction of an angle $\theta$ along the circumference of a shaft is bonded to the shaft along its circumference. A U-shaped first core member having end faces opposite to the ribbons is provided in the vicinity of the shaft. An exciting coil for producing a magnetic flux and a detecting coil are wound around the core member, and the magnetic flux produced by the exciting coil and introduced through the ribbon to the core member is detected by the detecting coil. When an exciting current of a predetermined frequency is supplied from an oscillator to the exciting coil to produce a magnetic flux, an output signal is generated from the detecting coil and is measured by a voltmeter.

10 Claims, 13 Drawing Figures

TORQUE SENSOR OF THE NONCONTACT TYPE

BACKGROUND OF THE INVENTION

1. Field of the Invention

The present invention relates to a torque sensor of the noncontact type and, more particularly, to a torque sensor for converting the torque of a rotational shaft into an electric signal.

2. Discussion of Background

It has been recently required in a system for generating a rotary force, such as an engine system, to control a system for generating the rotary force in response to a signal from a sensor which senses the rotary torque. Thus, a variety of sensors for sensing the rotary torque have been proposed. For examples, see the article by William J. Fleming and Paul W. Wood entitled, "Noncontact Miniature Torque Sensor for Automotive Application," SAE paper 830206, presented at the Autopmotive Engineering Congress; the article by K. Harada, I. Sasadas, T. Kawajiri, and M. Inoue entitled, "A New Torque Transducer Using Stress Sensitive Amorphous Ribbons," IEEE Transactions on Magnetics, Vol. MAG-18, No. 6, November 1982; and also see Japanese Patent disclosure (Kokai) No. 57-211030 (corresponding to U.S. application Ser. No. 268,890 filed on June 1, 1981). In these torque sensors, the following problems have been pointed out.

In the torque sensor proposed by Fleming et al in "Noncontact Miniature Torque Sensor for Automotive Application," the torque is measured by the variation in the magnetic properties of the engine crankshaft in response to the torque applied to the shaft, i.e., the magnetic permeability. However, there is also the problem such that the magnetic properties of the measuring range of the engine crankshaft are not uniform making it difficult to accurately measure the torque due to the magnetic anisotropy on the surface and in the crankshaft. Since the engine crankshaft itself does not have large magnetic permeability, it is necessary to generate a magnetic flux sufficient to penetrate the measuring range of the crankshaft and to be detected, with the adverse result that the device for generating the magnetic flux must be large in size. In contrast, K. Harada et al in "A New Torque Transducer Using Stress Sensitive Amorphous Ribbons" and Japanese Patent Disclosure (KOKAI) No. 57-211,030 describes a torque sensor in which an amorphous magnetic ribbon is bonded to a shaft, and in which a coil assembly is provided coaxially with the axis of the shaft. The torque sensor generates a magnetic flux parallel with its axis which measures the permeability of the amorphous magnetic ribbon which varies in response to the torque applied to the shaft. This torque sensor prevents the possibility of an erroneous detection based on the irregular magnetic properties of the material. However, a relatively large reverse magnetic field is produced when the coil assembly generates a magnetic flux in parallel with the axis of a shaft. Accordingly, there is the problem that a relatively large exciting current may be supplied to the coil assembly. Since the coil assembly is provided around the shaft, it is necessary to form a space for it, and so the sensor cannot be readily assembled into the system for generating rotary force, and the space for associating the sensor cannot be obtained in some systems.

SUMMARY OF THE INVENTION

It is an object of the present invention to provide a torque sensor of a noncontact type capable of being readily disposed in a relatively small space and capable of accurately detecting the torque of a rotational shaft using only a relatively small exciting current.

According to the present invention, a magnetic ribbon having a sheet shape is bonded to a shaft where its torque is sensed. The magnetic ribbon has been applied with an induced magnetic anisotropy in a direction of an angle $\theta$ to the circumferential direction of the shaft. A core member having end faces opposite to the magnetic ribbon is provided. An exciting coil for producing a magnetic flux is wound around the core member, and a detecting coil for detecting the magnetic flux, which is introduced into the core member through the magnetic ribbon along the circumferential direction of the shaft, is wound around the magnetic core. The torque applied to the shaft is present as variations in the magnetic permeability of the magnetic ribbon and the voltage detected by the detecting coil. Therefore, the torque can be sensed as the voltage detected by the detecting coil.

DETAILED DESCRIPTION OF THE PREFERRED EMBODIMENTS

Figure 1:
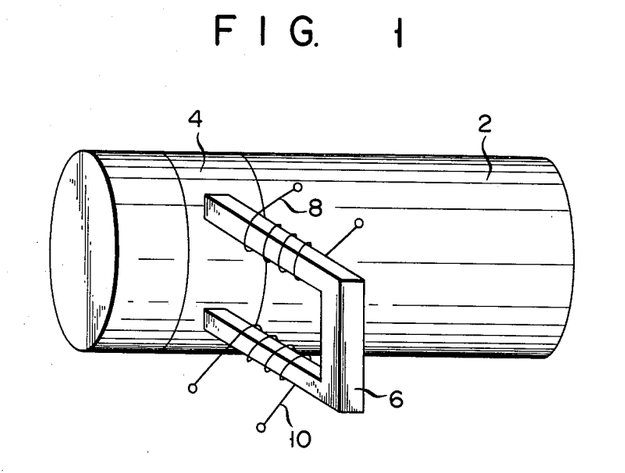
FIG. 1 is a perspective view schematically showing an embodiment of a torque sensor of a noncontact type according to the present invention.

In a torque sensor of a noncontact type as shown in FIG. 1, a magnetic sheet, preferably an amorphous magnetic ribbon 4 is arranged along the circumferential direction of a shaft 2 and is bonded to the shaft 2 to which rotary torque is applied. Further, an induced magnetic anisotropy is applied in advance to the amorphous magnetic ribbon 4 in the direction of angle $\theta$ to the circumferential direction of the ribbon. A U-shaped magnetic core 6 formed of a magnetic material, for example, an oxide magnetic material is disposed in the vicinity of the shaft 2, and the end faces of the core 6 are opposite to the amorphous magnetic ribbon 4 through gaps. An exciting coil 8 for generating a magnetic flux and a detecting coil 10 for detecting the magnetic flux depending upon the magnetic permeability of the amorphous magnetic ribbon 4 are wound around the U-shaped magnetic core 6.

Figure 2:
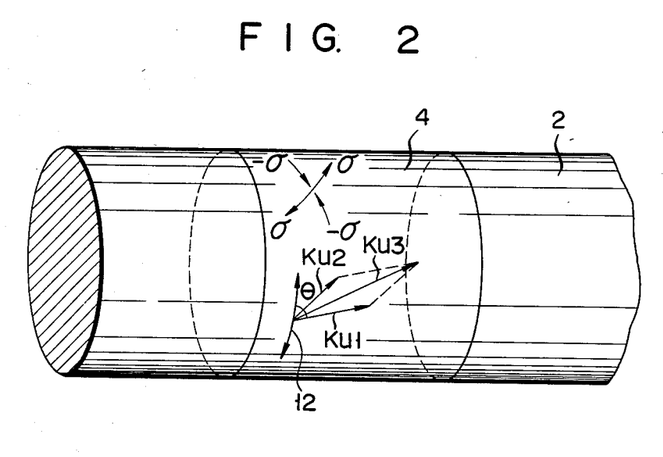
FIG. 2 is an explanatory view showing the principle of the torque sensor in FIG. 1.
Figure 3:
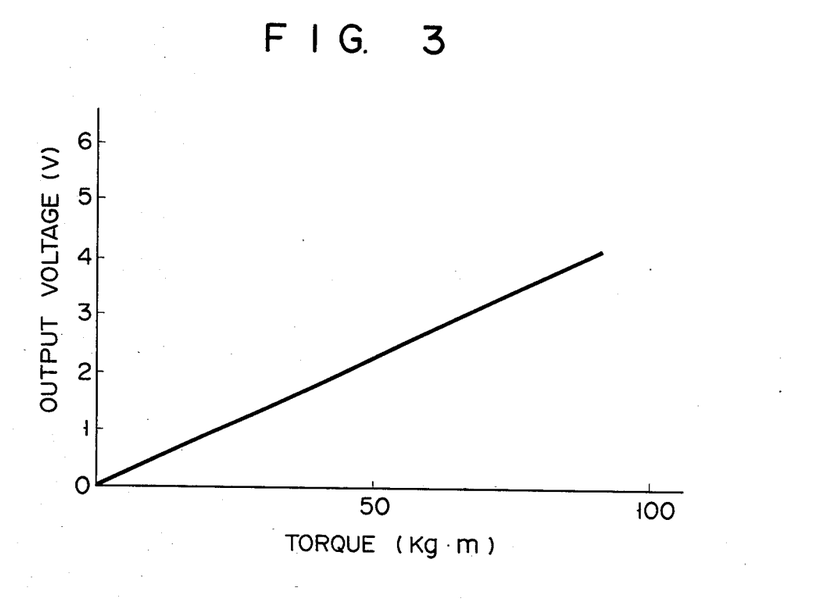
FIG. 3 is a graph showing the relationship between the output voltage detected by the detecting coil and the torque.

Such a torque sensor of a noncontact type detects the torque according to the principle which will be described. Here, an induced magnetic anisotropy $Ku_1$ is applied in advance to the amorphous magnetic ribbon 4 in the direction of angle $\theta \geq 45°$ along the circumferential direction of the shaft 2, and its saturated magnetostriction is to be $\lambda_s \geq 0$. When the rotary torque as shown by an arrow 12 is transmitted to the shaft 2 as shown in FIG. 2, a distortion stress generated at the shaft 2 is transmitted to the amorphous magnetic ribbon 4. A tension $+\sigma$ is produced in a direction of $+45°$ to the circumferential direction in the magnetic ribbon 4, and a compression stress $-\sigma$ is produced in a direction of $-45°$ to the circumferential direction. A magnetic anisotropy $Ku_2$ is induced by the magnetostriction in the magnetic ribbon 2 in response to these tensions $+\sigma$ and the compression stress $-\sigma$. Therefore, a magnetic anisotropy $Ku_3$ is produced as the resultant vector of the magnetic anisotropys $Ku_1$ and $Ku_2$. In general, the magnetic permeability depends upon the direction of the vector of the magnetic anisotropy $Ku_3$, and the variations in the magnetic permeability are present as variations in the mutual inductance in the magnetic ribbon 4 between the exciting coil 8 and the detecting coil 10 in the sensor as shown in FIG. 1. In other words, when a constant AC voltage is applied to the exciting coil 8 to generate the magnetic flux which passes through the magnetic ribbon 4 extending along the circumference of the shaft 2 to be detected by the detecting coil 10, the variations in the torque applied to the shaft 2 are present as variations in the AC voltage induced in the detecting coil 10. From actual experiments, it has been confirmed that linearity exists between the torque applied to the shaft 2 and the change of the voltage induced in the detecting coil 10 and measured by a voltmeter (not shown) as shown in FIG. 3.

Figure 4:
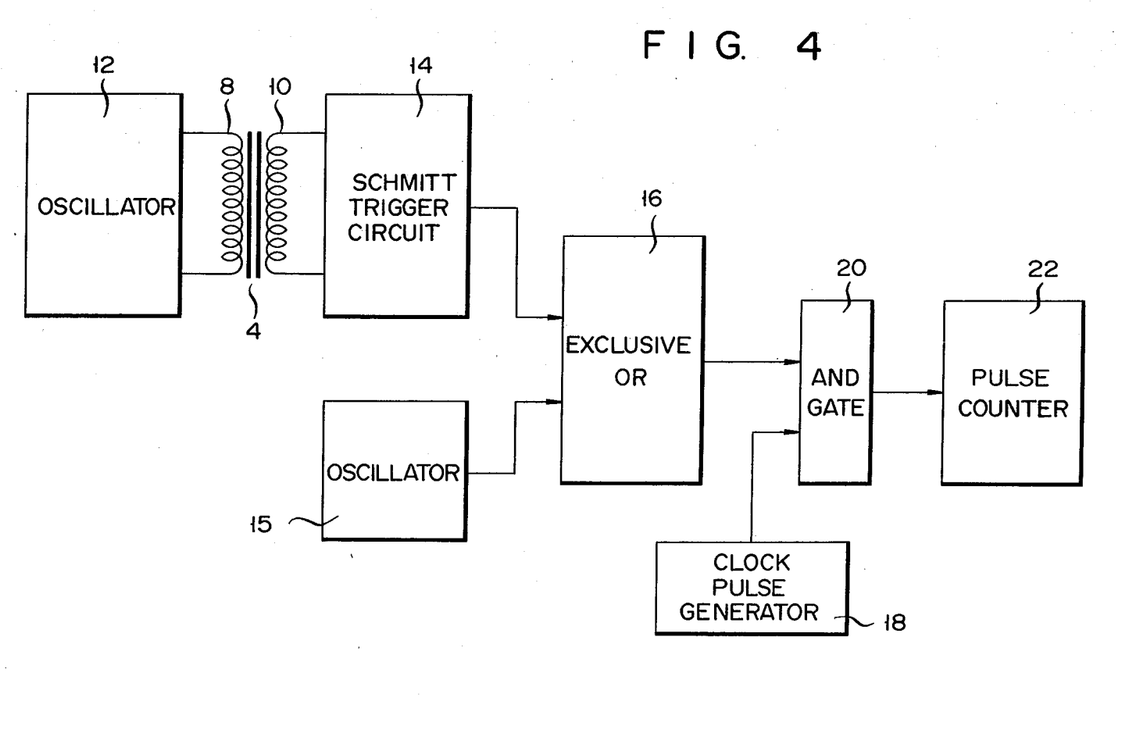
FIG. 4 is a block diagram of a detecting circuit applied to the torque sensor in FIG. 1.

Next, one embodiment of a circuit for the torque sensor shown in FIG. 1 will be described with reference to FIG. 4. In the circuit of FIG. 4; the variations in the torque applied to the shaft 2 are detected as variations in the phase of the AC voltage generated from the detecting coil 10 instead of change of the AC voltage generated from the detecting coil 10, which is measured by the voltmeter. In other words, the inductance L in the magnetic ribbon 2 between the exciting coil 8 and the detecting coil 10 varies due to the variations in the torque applied to the shaft 2. The AC voltage generated from the detecting coil 10 is produced by a delay in the phase by $\pm \omega \Delta L$ to the AC voltage applied to the exciting coil 8, where the variations in the inductance L are $\Delta L$, and the frequency of the AC voltage applied to the exciting coil 8 is $\omega$. This phase delay $\pm \omega \Delta L$ is detected in the circuit in FIG. 4 by utilizing the above relation.

In the circuit shown in FIG. 4, an exciting coil 8 is connected to an oscillator 12 for generating the voltage of a predetermined frequency $\omega$, and is connected to a Schmitt trigger circuit 14 for converting the AC voltage generated from the detecting coil 10 to a rectangular wave. Thus, this Schmitt trigger circuit 14 generates a rectangular signal having a frequency $\omega$ and is delayed in phase by $\pm \omega \Delta L$ by the voltage generated from the oscillator 12. This rectangular signal is supplied to an exclusive OR 16 connected to a rectangular wave oscillating circuit 15 which generates a rectangular wave signal having a frequency $\omega$ with the same phase as the voltage generated from the oscillator 12. Therefore, a pulse signal having a phase delay time T corresponding to the phase delay $\pm \omega \Delta L$ is generated from the exclusive OR 16. This pulse signal is supplied to an AND gate 20 connected to a clock pulse generator 18 which generates a clock pulse, and the pulse width of the pulse signal is converted by the AND gate 30 to a clock pulse. The clock pulse from the AND gate 20 is counted by a pulse counter 22. Since the counted value of the pulse counter 22 equals the phase delay time T corresponding to the phase delay $\pm \omega \Delta L$, it also corresponds to the torque applied to the shaft 2. Though the conventional torque sensor requires that an exciting current of approximately 100 mA be supplied to the exciting coil 8 wound around the shaft 2, the torque sensor of the present invention can accurately detect the torque when an exciting current of approximately 5 mA is supplied to the exciting coil 8 provided on the core 6. Further, since the exciting current can be reduced, the torque sensor of the invention can prevent the influence from the shaft 2 formed of a ferromagnetic material, i.e., the probability of mixing noise with the output voltage from the detecting coil 10. In addition, since the torque sensor of the invention does not require an amplifier having a high amplification factor different from the conventional torque sensor, its electric circuit can be simplified.

Figure 5:
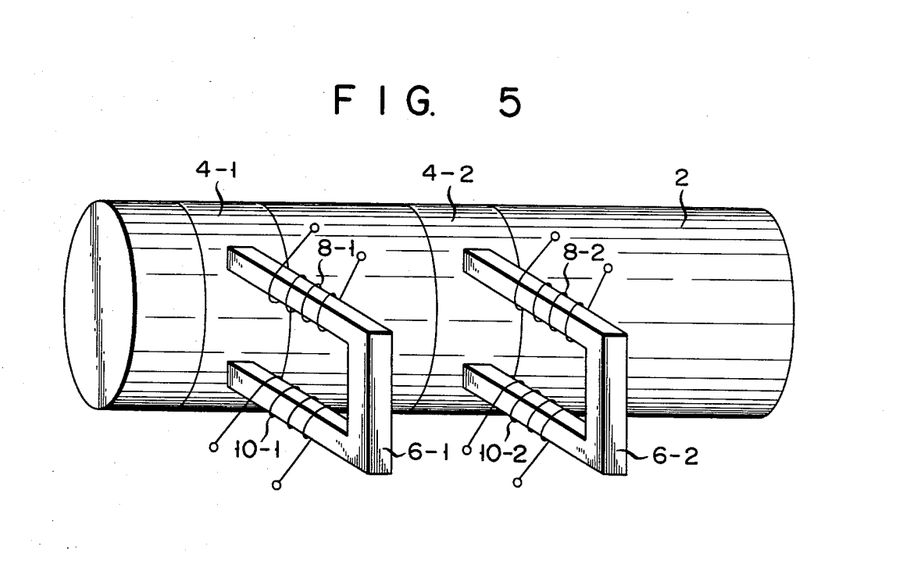
FIG. 5 is a perspective view schematically showing another embodiment of a torque sensor of a noncontact type according to the present invention.
Figure 6:
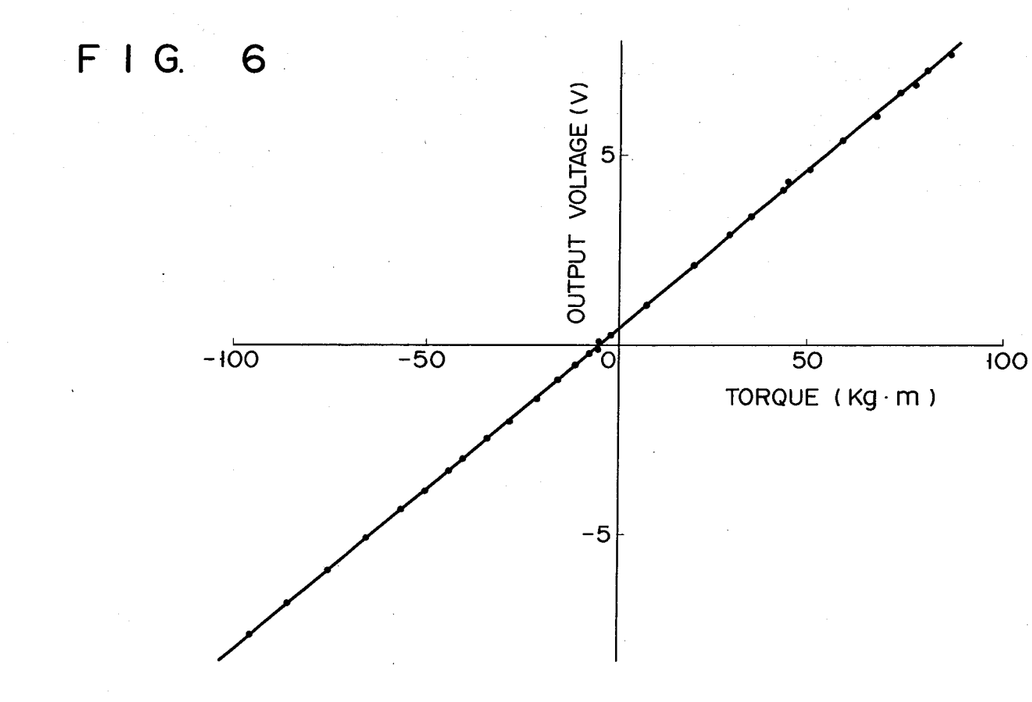
FIG. 6 is a graph showing the relationship between the output voltage detected by the detecting coil and the torque.

Referring now to FIG. 5, a modified embodiment of the present invention will now be described. In a torque sensor shown in FIG. 5, a pair of magnetic sheets or amorphous magnetic ribbons 4-1 and 4-2 are arranged along the circumferential direction of the shaft 2 and bonded to the shaft 2 along to which a rotary torque is applied. Further, an induced magnetic anisotropy is applied in advance to the one amorphous magnetic ribbon 4-1 at an angle $\theta$ to the circumferential direction, and an induced magnetic anisotropy is applied in advance to the other amorphous magnetic ribbon 4-2 $-\theta$ to the circumferential direction. A pair of U-shaped magnetic cores 6-1 and 6-2 formed of an oxide magnetic material is disposed in the vicinity of the shaft 2, each end face of the magnetic cores 6-1 and 6-2 is respectively placed opposite to the amorphous magnetic ribbons 4-1 and 4-2 through gaps. Exciting coils 8-1 and 8-2 for generating magnetic fluxes, and detecting coils 10-1 and 10-2 for detecting magnetic fluxes depend upon the magnetic permeability of the amorphous magnetic ribbons 4-1 and 4-2 which are respectively wound around the U-shaped magnetic cores 6-1 and 6-2. In the torque sensor shown in FIG. 5, even if a rotary torque of a positive direction such as clockwise direction is applied to the shaft 2 or even if a rotary torque of negative direction such as counterclockwise direction is applied to the shaft 2, the torque can be accurately detected as shown in FIG. 6, when the voltage generated by the detecting coils 10-1 and 10-2 are measured by a voltmeter. As apparent from FIG. 6, the output voltage detected by the torque sensor has sufficient linearity to the torque of the positive or negative direction actually applied to the shaft 2.

Figure 7:
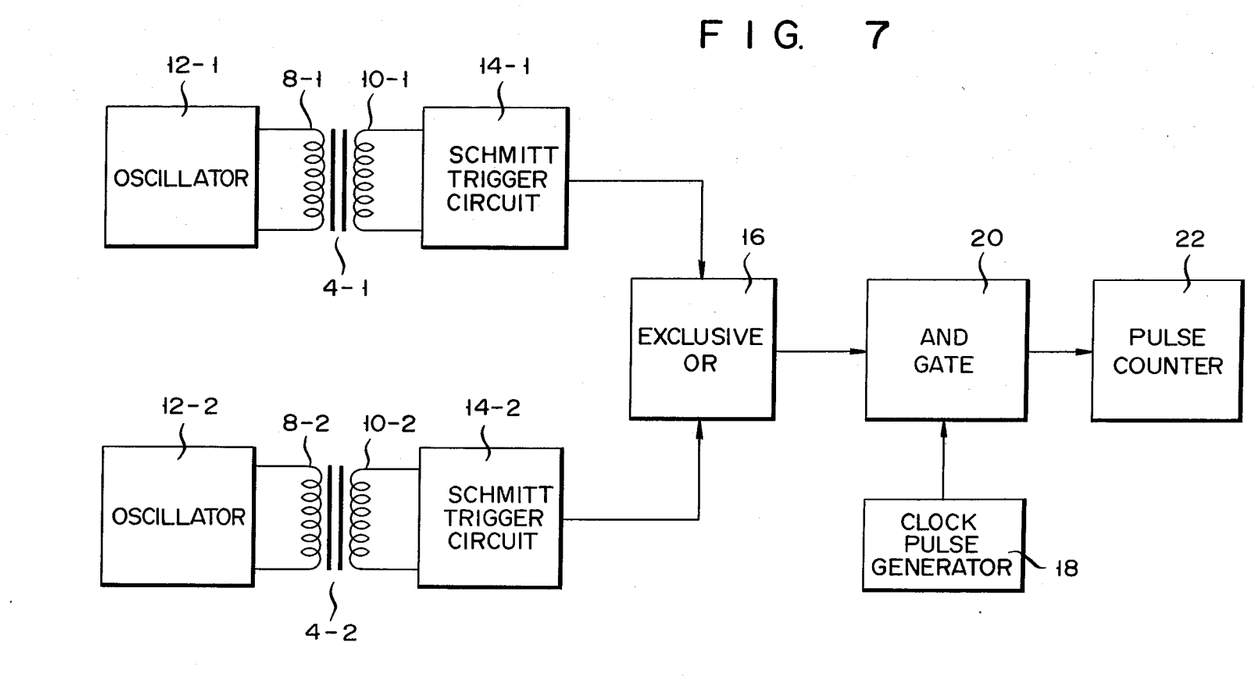
FIG. 7 is a block diagram of a detecting circuit applied to the torque sensor in FIG. 5.

FIG. 2 shows one embodiment of a circuit arrangement for the torque sensor shown in FIG. 5. As shown in FIG. 7, the exciting coils 8-1 and 8-2 are respectively connected to the oscillators 12-1 and 12-2 for generating the voltages of the frequency $\omega$, and the detecting coils 10-1 and 10-2 are respectively connected to the Schmitt trigger circuits 14-1 and 14-2 for converting the AC voltages generated from the detecting coils 10 into rectangular waves. Therefore, when no torque is applied to the shaft 2 at all, a phase difference does not occur between the output voltages generated from the detecting coils 10-1 and 10-2, and so rectangular wave signals are not generated from any of the Schmitt trigger circuits 14-1, 14-2. When a predetermined torque is applied to the shaft 2, a phase difference is produced between the output voltages generated from the detecting coils 10-1 and 10-2; a rectangular wave signal advancing in phase by $+\omega\Delta L$ is generated from one Schmitt trigger circuit 14-1; and a rectangular wave signal delaying in phase by $-\omega\Delta L$ is generated from the other Schmitt trigger circuit 14-2. These rectangular wave signals are supplied to the exclusive OR 16. Therefore, a pulse signal having phase delay time 2T corresponding to the phase delay $2\omega\Delta L$ is generated from the exclusive OR 16. This pulse signal is supplied to the AND gate 20 connected to the clock pulse generator 18 for generating a clock pulse, and the pulse width of the pulse signal is converted by the AND gate 20 into a clock pulse. The clock pulse from the AND gate 20 corresponding to the torque applied to the shaft 2 is counted by the pulse counter 22.

In the torque sensor shown in FIG. 5, even if a rotary torque of a positive direction such as clockwise direction is applied to the shaft 2 or even if a rotary torque of negative direction such as counterclockwise direction is applied to the shaft 2, the torque can be accurately detected.

Figure 8A:
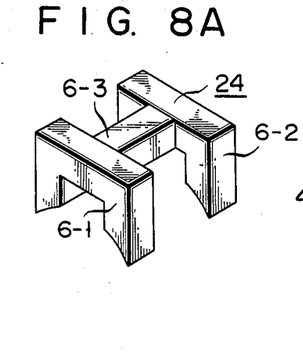
FIGS. 8A, 8B, 9A, 9B, 10 and 11 are perspective view and circuit diagrams schematically showing various embodiments of a torque sensor of a noncontact type according to the present invention.
Figure 8B:
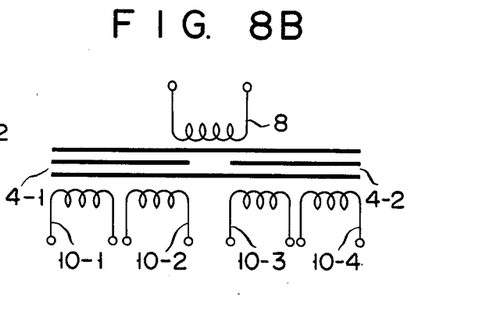
Figures 9A, 9B, 10:
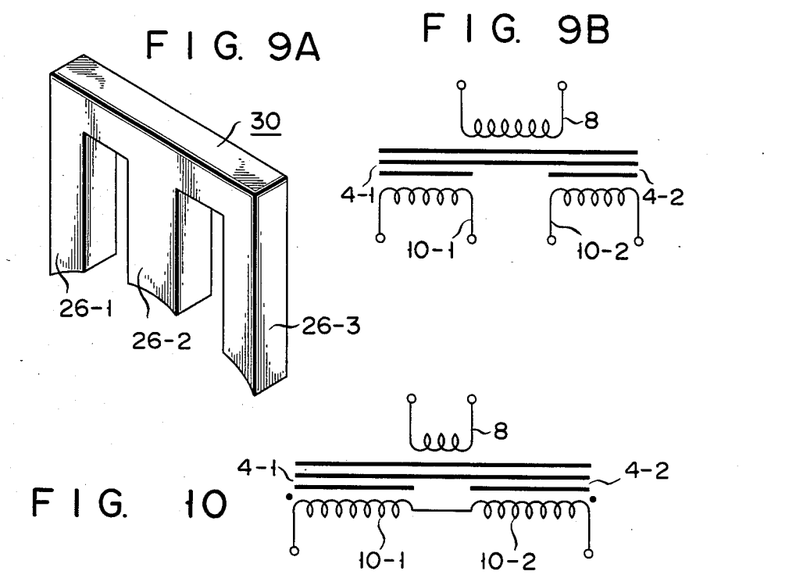

In the embodiment shown in FIG. 5, a pair of U-shaped magnetic cores 6-1 and 6-2 are separately arranged. However, a core assembly 24 in which a pair of U-shaped magnetic cores 6-1 and 6-2 may be coupled to each other by a coupling bar 6-3 as shown in FIG. 8A may be adopted. In this core assembly 24, a magnetic circuit may be composed so that an exciting coil 8 is wound around the coupling bar 6-3, and so that detecting coils 10-1, 10-2, 10-3 and 10-4 are respectively wound around the legs of the magnetic cores 6-1 and 6-2, as shown in FIG. 8B. Further, a core assembly 30 in which core legs 26-1, 26-2 and 26-3 are coupled by a coupling core 28 as shown in FIG. 9A instead of the pair of magnetic cores 6-1 and 6-2 may be employed. In the core assembly 30, an exciting coil 8 is wound around the core legs 26-2; detecting coils 10-1 and 10-2 are respectively wound around the legs 26-1 and 26-2; and a magnetic circuit may be composed as shown in FIG. 9B.

Figure 11:
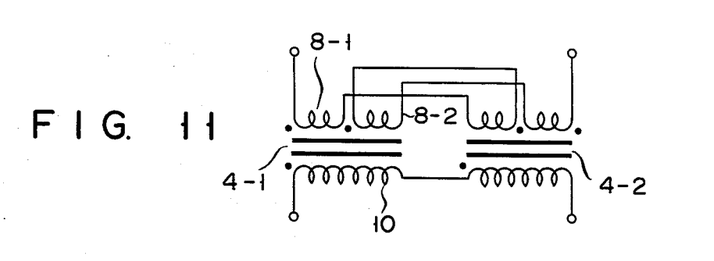

The output characteristics shown in FIG. 6 may be obtained by a voltmeter by suitably winding the exciting coils and the detecting coils around the pair of U-shaped magnetic cores 6-1 and 6-2 shown in FIG. 5, by winding the coils around the core assembly 34 shown in FIG. 8A, or by winding the coils around the core assembly 30 shown in FIG. 9A, respectively. In other words, the winding directions of the detecting coils 10-1 and 10-2 wound on the core legs shown in FIG. 10 may be altered to be connected in the core assembly shown in FIG. 8A. Further, similarly, the exciting coils 8-1 and 8-2 are wound around all the magnetic cores 6-1 and 6-2 as shown in FIG. 11, and the detecting coils 10-1 and 10-2 wound by altering the winding direction or by winding in the same direction may be connected in series with each other.

The magnetic ribbon 4 may be formed of Permalloy (Fe-Ni alloy), Sendust (Fe-Al-Si alloy), or may be preferably formed of amorphous alloy. It is further preferred that, even if a magnetic alloy is employed, its saturated magnetostriction $\lambda_s$ preferably fall within the range of the following inequality:

$$1\times 10^{-6} \leq |\lambda_s| < 20\times 10^{-6}.$$

The torque sensor having a magnetic ribbon formed of such a magnetic alloy has a torque with excellent linearity. The above-described range is based on the following consideration by the inventors. It has been discovered by the inventors that the linearity to the torque largely depends upon the saturated magnetostriction $\lambda_s$ and the induced magnetic anisotropy $Ku_0$. In other words, according to the inventors' studies, when $Ku_0/3\cdot\lambda_s\cdot\sigma A > 2$ ($Ku_0$: induced magnetic anisotropy; $\lambda_s$: saturated magnetostriction; and $\sigma A$: surface stress of a thin magnetic ribbon), $$|T| \leq \frac{\pi d^3}{16} \cdot \frac{G_T}{G_A} \cdot \sigma A.$$

It was discovered that excellent linearity can be obtained in the range of the above inequality (where T: torque; d: diameter of torque transmission shaft (rotational shaft); $G_T$: rigidity of torque transmission shaft; $G_A$: rigidity of magnetic metal ribbon).

That is, $$|T| \leq \frac{\pi d^3}{96} \cdot \frac{G_T}{G_A} \cdot \left(\frac{Ku_0}{\lambda_s}\right).$$

The preferred linearity can be obtained in the range of the above inequality.

As apparent from the above-described inequalities, it has also been discovered that the value of $Ku_0/\lambda_s$ becomes an important factor so as to guarantee that the linearity of the torque have a wide range.

The physical meanings of these inequalities are such that in the composition between the inducted magnetic anisotropy $Ku_0$ and $3\lambda_3\sigma A$ of two types, an unstability can occur in the magnetization susceptible direction in the vicinity of $Ku_0 \approx 3\lambda_s\sigma A$, thereby causing a saturation phenomenon. If the $Ku_0$ is significantly larger than $3\lambda_s\sigma A$, this saturation phenomenon does not take place, but the magnetization susceptible direction slightly varies in the vicinity of the $Ku_0$. This critical value of the linearity phenomenon is shown in: $Ku_0/\lambda_s = 2$.

According to the inventors' studies as described above, it was found that the larger the $Ku_0/\lambda_s$ is, the more the linearity in the torque can be guaranteed to have a wide range.

In the stress sensor using magnetostriction, the performance of a larger saturated magnetostriction has been heretofore noted. This is because the efficiency of converting stress into the magnetic variation is meant to be increased.

By considering linearity, since the larger the $Ku_0/\lambda_s$ is, the better the linearity, it is necessary to increase $Ku_0$ upon increasing $\lambda_s$. However, $Ku_0$ has a critical value ($15\times 10^3$ erg/cm$^3$). Thus, the larger $\lambda_s$ is, the less the linearity. For example, when the maximum torque of the engine shaft for a vehicle reaches 100 kg·m, it is necessary to place the value of $Ku_0$ which exceeds $35\times 10^3$ erg/cm$^3$ by treating it in a magnetic field and by considering the diameter of the shaft so as to prove the linearity of the range. However, this value exceeds the critical value, and is, accordingly, impossible.

Therefore, excellent linearity can be obtained even in the range of $1\times 10^{-6} \leq |\lambda_s| < 20\times 10^{-6}$ as described above.

As for $Ku_0$, when the magnetic metal ribbon is treated in a magnetic field, the value of $Ku_0$ must be higher than predetermined value to give the ideal uniaxial magnetic anisotropy. Therefore, $Ku_0 > 1 \times 10^{+3}$ erg/cm$^3$.

The thin magnetic metal strip used in the present invention may, for example, include magnetic materials of permalloy (Fe-Ni alloy), Sendust (Fe-Al-Si alloy), aram Fe-Si alloy. However, it is preferable to employ an amorphous alloy having a larger $Ku_0$ and large variable $Ku_0/\lambda_s$.

When the amorphous alloys represented by the following formula are employed, a torque sensor having excellent linearity can be obtained:

$(Co_{1-a-b}Fe_aM_b)_zSi_xB_y$

M = at least one selected from the group consisting of Ti, Zr, Hf, V, Nb, Ta, Cr, Mo, W, Mn, Re, Ru, Ir, Pd, Pt, Ag, Au, Cu, Zn, Al, Ga, In, Ge, Sn, Pb, Sb, Bi, Y, and rare earth metals, $0.05 \leq a \leq 0.5$, $0 \leq b \leq 0.15$, $0 \leq x \leq 20$, $4 \leq y \leq 35$, $x + y + z = 100$ where Fe is indispensible to obtain large value of induced magnetic anisotropy and to control the saturation magnetostriction. Except in the case of $a < 0.05$, the induced magnetic anisotropy and saturated magnetostriction are small. In case of $a > 0.5$, the saturated magnetostriction becomes excessively large, and the linearity decreases.

Therefore, it is preferred to set the range so that $0.05 \leq a \leq 0.5$.

M increases the crystallizing temperature of the amorphous alloy, improves the thermal stability, can adjust the magnitude of the thermal expansion coefficient, can match the magnitude of the thermal expansion coefficient of the rotary shaft material, and is effective to obtain a torque sensor having high reliability. However, if b exceeds 0.15, it becomes difficult to achieve amorphousness. Therefore, b is preferably less than 0.15.

The effects of M start by presenting the addition of a small amount within, the range of $0.01 \leq B \leq 0.12$.

Si raises the crystallizing temperature. The above range is limited because if x exceeds 20, it becomes difficult to manufacture an amorphous alloy. B is indispensible to the manufacture of an amorphous alloy. The above range is limited because, if y is less than 4 or more than 35, it becomes difficult to manufacture an amorphous alloy.

The preferable lower limit of Si, in fact, is $1 < Si$. This is because, when the content of Si increases, the productivity of the amorphous alloy is enhanced.

Experimental examples of the present invention will now be described.

A pair of amorphous alloy thin strips having a composition listed in Table 1 (approximately 5 mm in width and 30 microns in mean thickness) was produced by a single roll method. After induced magnetic anisotropys of +45° and −45° were applied to the amorphous alloy ribbons at the heat treating temperature of 300° C. in a magnetic field for one hour and were left in a furnace (the magnetic field applying direction is 45° to the longitudinal direction of the ribbon with 2000 Oe), the strips were fixed to the circumferential direction of a torque transmission shaft having 55 mm in diameter. The torque was detected by a torque sensor using the magnetic ribbons shown in FIG. 5, and the linearity to the torque was obtained. The obtained linearity, i.e., the degree of linearity, is listed in Table 1.

In Table 1, the saturated magnetostriction ($\lambda_s$) was obtained by a strain gauge method, and the induced magnetic anisotropy (Ku) was obtained by applying a magnetic field to the longitudinal and lateral directions of the amorphous alloy, heat-treating the amorphous alloy, and was calculated from the area surrounded by two magnetizing curves in the first quadrant of the magnetization curve.

The linearity is represented by the approximate ratio (degree of linearity (%)) between the minimum square rectilinear line of the torque value of 70 kg·m and 28 value of the minimum square rectilinear line of the output.

TABLE 1

| | Sample number | Alloy composition | $\lambda_s \times 10^6$ | Ku (erg/cm$^3$) | Linearity (%) |
|---|---|---|---|---|---|
| Examples | 1 | $(Co_{.7}Fe_{.3})_{78}Si_8B_{14}$ | 12 | $9 \times 10^3$ | 2 |
| | 2 | $(Co_{.6}Fe_{.4})_{75}Si_{10}B_{15}$ | 15 | $10 \times 10^3$ | " |
| | 3 | $(Co_{.8}Fe_{.2})_{83}Si_5B_{12}$ | 7 | $7 \times 10^3$ | " |
| | 4 | $(Co_{.7}Fe_{.3}Cr_{.05})_{80}Si_{10}B_{10}$ | 5 | $5 \times 10^3$ | " |
| | 5 | $(Co_{.6}Fe_{.35}Nb_{.05})_{80}Si_{10}B_{10}$ | 6 | $4 \times 10^3$ | " |
| | 6 | $(Co_{.8}Fe_{.15}Mo_{.05})_{80}Si_{10}B_{10}$ | 4 | $4 \times 10^3$ | " |
| | 7 | $(Co_{.7}Fe_{.2}Hf_{.20})_{83}Si_5B_{12}$ | 8 | $6 \times 10^3$ | " |
| Comparison Examples | 1 | $(Co_{.2}Fe_{.8})_{85}Si_5B_{10}$ | 40 | $9 \times 10^3$ | 10 |
| | 2 | $Co_{75}Si_{10}B_{15}$ | −0.8 | $0.3 \times 10^3$ | 20 |
| | 3 | $Fe_{77}Si_{10}B_{13}$ | 35 | 0.2 | 40 |

As apparent from Table 1, it can be understood that the composition which has the value of $\lambda_s$ in $1 \times 10^{-6} \leq |\lambda_s| < 20 \times 10^{-6}$ has excellent linearity. Therefore, when this composition is used for a system varying the torque in a wide range such as an engine shaft for a vehicle, it is very effective.

What is claimed is:

1. A torque sensor of a noncontact type for sensing a rotary torque applied to a shaft, comprising:
   a first film shaped magnetic ribbon bonded to the shaft along the circumferential direction of the shaft, said ribbon comprising a magnetic material having a previously induced magnetic anisotropy in a direction of an angle $\theta$ to the circumferential direction of the shaft;
   a first core member formed of a magnetic material and having end faces opposite to said ribbon bonded to said shaft;
   a first exciting coil wound around said first core member for producing a magnetic flux; and
   a first detecting coil wound around said first magnetic core member for detecting a magnetic flux produced by the first exciting coil and introduced to the core member through said ribbon along the circumferential direction of the shaft and generating an output signal.

2. A torque sensor of a noncontact type according to claim 1, further comprising:
   means connected to the exciting coil for generating an exciting current of a predetermined frequency;
   means connected to the detecting coil for converting the output signal generated from the detecting coil into a rectangular wave signal;
   means for generating a reference rectangular wave of the same frequency and phase as those of a current generated from the means for generating the exciting current;
   means for comparing the difference of the phase between the reference rectangular wave from the means for generating the reference rectangular wave and the rectangular wave signal from the means for converting the output signal generated from the detecting coil into the rectangular wave signal and for generating a rectangular wave corresponding to the phase difference;
   means for generating a clock pulse;
   means for sampling the rectangular wave corresponding to the phase difference by the clock pulse and generating the sampling pulse; and
   means for counting the sampling pulse.

3. A torque sensor of a noncontact type according to claim 1, further comprising:
   a second film shaped magnetic ribbon bonded to the shaft along the circumferential direction of the shaft, said second ribbon comprising a magnetic material and applied in advance with an induced magnetic anisotropy in a direction of an angle $-\theta$ to the circumferential direction of the shaft;
   a second core member formed of a magnetic material and having end faces opposite to the second ribbon;
   a second exciting coil wound around the second core member for producing a magnetic flux; and
   a second detecting coil wound around the magnetic core member for detecting a magnetic flux produced by the second exciting coil and introduced into the core member through the second ribbon along the circumferential direction of the shaft and generating an output signal.

4. A torque sensor of a noncontact type according to claim 3, further comprising:
   first and second means respectively connected to the first and second exciting coils for generating an exciting current of a predetermined frequency;
   first and second means respectively connected to the first and second detecting coils for respectively converting the first and second output signals generated from the first and second detecting coils into first and second rectangular signals;
   means for comparing the difference of the phase between the first and second rectangular signals from the first and second means for converting into the rectangular signals and generating a rectangular wave corresponding to the phase difference;
   means for generating a clock pulse;
   means for sampling the rectangular wave corresponding to the phase difference by the clock pulse and generating a sampling pulse; and
   means for counting the sampling pulse.

5. A torque sensor of a noncontact type according to claim 1, further comprising:
   a second magnetic ribbon of film shape bonded to the shaft along the circumferential direction of the shaft, formed of a magnetic material and applied in advance with an induced magnetic anisotropy in a direction of an angle $-\theta$ to the circumferential direction of the shaft; and
   a second detecting coil wound around the core member for detecting a magnetic flux produced by the first exciting coil and introduced into the core member through the second ribbon along the circumferential direction of the shaft and generating an output signal,
   said magnetic core member formed of a pair of U-shaped magnetic core elements having end faces opposite the first and second magnetic ribbons and a core bar for coupling these magnetic core elements, the exciting coil wound on the core bar, and the first and second detecting coils wound on the core elements.

6. A torque sensor of a noncontact type according to claim 1, further comprising:
   a second magnetic ribbon of film shape bonded to the shaft along the circumferential direction of the shaft, formed of a magnetic material and applied in advance with an induced magnetic anisotropy in a direction of an angle $-\theta$ to the circumferential direction of the shaft;
   a second detecting coil wound on the magnetic core member for detecting a magnetic flux produced by the first exciting coil and introduced into the core member through the second ribbon and generating an output signal; and
   said magnetic core member formed of first, second and third core legs having end faces opposite the first and second magnetic ribbons and coupled to each other, the exciting coil and the first and second detecting coils wound on the core legs.

7. A torque sensor of noncontact type according to claim 1, wherein said magnetic ribbon has saturated magnetostriction $\lambda_s$ defined by the following inequality:

$$1 \times 10^{-6} \leq |\lambda_s| < 20 \times 10^{-6}.$$

8. A torque sensor of a noncontact type according to claim 7, wherein the magnetic ribbon is formed of an amorphous alloy.

9. A torque sensor of noncontact type according to claim 8, wherein the amorphous alloy comprises a composition determined by the following formula:

$$(Co_{1-a-b}Fe_aM_b)_zSi_xB_y$$

where
   M = at least one selected from the group consisting of Ti, Zr, Hf, V, Nb, Ta, Cr, Mo, W, Mn, Re, Ru, Ir, Pd, Pt, Ag, Au, Cu, Zn, Al, Ga, In, Ge, Sn, Pb, Sb, Bi, Y, and rare earth metals $0.05 \leq a \leq 0.5$, $0 \leq b \leq 0.15$, $0 \leq x \leq 20$, $4 \leq y \leq 35$, $x+y+z=100$.

10. A torque sensor of a noncontact type according to claim 9, wherein the amorphous alloy satisfies the following inequality with the composition as defined:

$$0.01 \leq b \leq 0.12$$

$$1 \leq x \leq 20.$$

* * * * *